Patented July 14, 1953

2,645,646

UNITED STATES PATENT OFFICE 2,645,646

CHLORMETHYL DERIVATIVES OF DIBENZ-ANTHRONYL, DIBENZANTHRONE, AND ISODIBENZANTHRONE COMPOUNDS

David I. Randall, Easton, Pa., assignor to General Aniline & Film Corporation, New York, N. Y., a corporation of Delaware No Drawing. Application February 10, 1950,
Serial No. 143,596

3 Claims. (Cl. 260—363)

This invention relates to vat dye intermediates of the dibenzanthronyl, dibenzanthrone, and isodibenzanthrone series. More particularly it relates to the chlormethylation products of dibenzanthronyls, dibenzanthrones, and isodibenzanthrones.

Vat dyes of the dibenzanthronyl, dibenzanthrone, and isodibenzanthrone series are insoluble and not substantive to fabrics as such but form a valuable class of dyes due to their ability to pass into solution in a reduced or leuco form which may be applied to the fabric. The insoluble dye is treated with reducing agents which convert the insoluble dye to a phenolic form by reduction of one or more of the keto groups of the dibenzanthronyl, dibenzanthrone, or isodibenzanthrone compound. Alkaline solutions of the reduced or leuco compound possess great affinity for the fiber and may be readily reoxidized by known methods to reform the insoluble dye on the fiber.

It has now been discovered that these dibenzanthronyl, dibenzanthrone and isodibenzanthrone dyes may be converted to their halomethyl and particularly chloromethyl derivatives. These chloromethyl derivatives form an extremely valuable new class of vat dye intermediates and to some extent may be used as vat dyes themselves. Highly colored soluble dyes may be prepared from these intermediates by conversion to the quaternary ammonium and isothiouronium compounds. Such conversion products may be used to dye cotton directly from aqueous solution. When the chlormethylated dibenzanthronyls are fused in alkali the corresponding methyl compounds are produced by reduction of the chloromethyl groups.

Upon vatting the chloromethyl dibenzanthrones and chloromethyl isodibenzanthrones, the corresponding methyl compounds result. These compounds are considerably brighter on cotton than the methyl derivatives of dibenzanthrone and isodibenzanthrone synthesized by caustic fusion of chloromethylated dibenzanthronyl and chloromethylated isodibenzanthronyl. They are also brighter and bluer dyes than the starting materials. In nearly all cases, they are distinguished by excellent fastness properties.

Dizenzanthrones which are prepared from corresponding methyl benzanthrones are known. However, no such chloromethyl derivatives are known and cannot be prepared by direct chlorination since ring substitution results. These new chloromethyl compounds are not only useful for direct application of vat dyes, but also may be condensed with various primary and secondary amines to produce other new derivatives of dyestuff character. It is interesting to note that monochloromethyl as well as dichloromethyl derivatives may be made and that when reduced by a vatting procedure, the chloromethyl group is reduced to a methyl. Thus either the monomethyl or dimethyl dibenzanthrones may be prepared with equal facility. It is practically impossible to make the monomethyl dibenzanthrones by the known method referred to above starting with methyl benzanthrones. The dimethyl derivative is possible and mixtures of dimethyl, monomethyl and unmethylated dibenzanthrones are possible starting from benzanthrones and methylbenzanthrones but not the pure monomethyl derivative.

The chloromethyl derivatives are produced by dissolving the dibenzanthronyl, dibenzanthrone or isodibenzanthrone compound in 96% sulfuric acid, introducing dichloro-dimethylether at room temperature and stirring the reaction mixture at temperatures of from 30° to 80° for several hours. The reaction may be represented by the following equation:

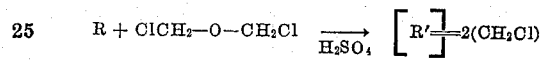

where R is a dibenzanthronyl, dibenzanthrone, or isodibenzanthrone compound and R' is the radical of such compound. The positions of the entering chloromethyl groups are not known with certainty but the following products are believed to be typical:

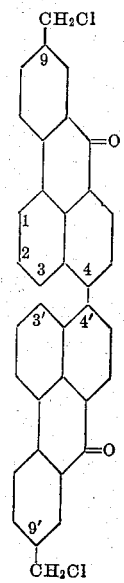

9,9'-di(chloromethyl)-4,4'-dibenzanthronyl

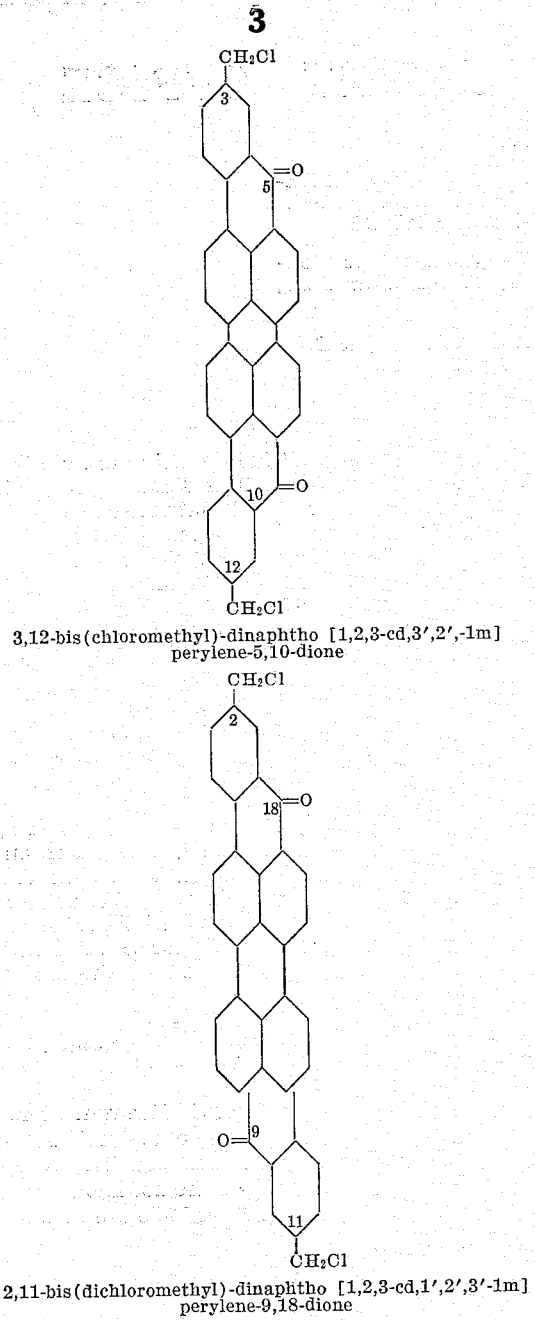

3,12-bis(chloromethyl)-dinaphtho [1,2,3-cd,3',2',-1m] perylene-5,10-dione 2,11-bis(dichloromethyl)-dinaphtho [1,2,3-cd,1',2',3'-1m] perylene-9,18-dione Halogenated dibenzanthronyl, dibenzanthrone and isodibenzanthrone readily undergo the reaction and are included as starting materials.

The invention will be further described with respect to the following examples which are intended to be illustrative of the invention but not limitative. Unless otherwise stated the parts are by weight.

*Example 1.—(Chlormethyl and dichlor dimethyldibenzanthrone)*

A solution of dibenzanthrone (violanthrone) in sulfuric acid was made by dissolving 23.0 g. of dibenzanthrone in 200 cc. of 96% sulfuric acid. To the solution was added dropwise 26.4 cc. dichlorodimethyl ether in 15 minutes. The solution was heated at 62° C. for 59 hours and then poured over ice and water. The precipitate was filtered, washed and triturated with excess 2% sodium bicarbonate solution and refiltered. Analysis: Chlorine Calc. 13.1 (for 2-chloromethyl groups), found, 11.2%.

If the reaction is run at 64-65° C. in 98% sulfuric acid for the same length of time, the chlorine analysis shows that two chloromethyl groups have been introduced. Lowering the temperature to 55° C. for 15 hours allows the introduction of a single chloromethyl group. These compounds on vatting lose their chlorine atoms and are converted to the corresponding methyl derivatives of dibenzanthrone. They dye cotton in substantially bluer shades and have excellent fastness properties.

*Example 2.—Di(chlormethyl) 3,3'-dibenzanthronyl*

A solution of 69.0 g. of 3,3'-dibenzanthronyl in 600 cc. of 96% sulfuric acid was heated to 40° C. At this temperature 77 cc. dichlorodimethyl ether is introduced dropwise. Heating at 65° C. is continued for 20 hours, then the reaction mixture is poured into water and the precipitate is filtered off and washed free of acid, then once with 1% sodium bicarbonate and finally with water. Weight after drying 84.0 g. Analysis: Chlorine calc. for 2 chlor methyl groups 12.85, found 12.55.

If 100% sulfuric acid is used, the dichloromethyl compound is obtained similarly at 45-49° C. in 8 hours.

At 25° C. in 96% surfuric acid, the monochloromethyl derivative is obtained after two days at this temperature.

*Example 3.—Di(chloromethyl) 4,4'-dibenzanthronyl*

The procedure was practically the same as in the foregoing example. 23.0 g. of 4,4'-dibenzanthronyl were dissolved in 150 cc. 96% sulfuric acid. To the solution was added dropwise 26.4 cc. of dichlorodimethyl ether. A temperature of 65-70° C. was held for 18 hours. Isolation of the yellowish green di(chloromethyl)-4,4'-dibenzanthronyl is accomplished as in Example 1. The yield is nearly quantitative. Chlorine calculated 12.8%, found 12.7%.

*Example 4.—(Chloromethyl isodibenzanthrone)*

60.0 g. of isodibenzanthrone were dissolved in 600 cc. of 96% sulfuric acid; then was added dropwise at 50° C. 79.2 cc. of dichlorodimethyl ether. After heating the solution for 16 hours at 55-65° C., the chloromethylated isoviolanthrone was worked up as in Example 1. The weight obtained was 77.0 g. Chlorine found 8.28%. This analysis corresponds to a mixture of about 2 moles of chloromethyl isoviolanthrone and 0.8 mole di(chloromethyl)-isoviolanthrone. Separation may be obtained by fractionation from sulfuric acid. Dyeings are obtained from the crude mixture which are considerably brighter and bluer than the starting material. Vatting removes the chlorine atom and is replaced by hydrogen so that a methyl derivative is obtained.

*Example 5.—Di(chlormethyl) isodibenzanthrone*

A solution of 69.0 g. isodibenzanthrone and 79.2 cc. dichlorodimethyl ether were warmed at 60-65° C. for 4 days. On cooling to room temperature, the sulfate of di(chloromethyl)isodibenzanthrone precipitated in crystalline form. The entire reaction mixture was poured into ice and water and worked up as in Example 1. Chlorine calculated for 2 chloromethyl groups 12.8%, found 11.0%. This new compound gave dyeings very much bluer and brighter than the starting material. On vatting, the chloromethyl groups were found completely reduced to methyl groups. The dyeings from the di(chlormethyl) derivative were noticeably bluer than those of the chloromethyl isodibenzanthrone.

Example 6.—Chloromethyl trichlorodibenzanthrone

A solution of 26.4 g. of trichlorodibenzanthrone and 30.0 cc. dichlorodimethyl ether (B. P. 104° C.) in 250 cc. 100% sulfuric acid was warmed 2 days at 65° C. Work-up of the solution as in Example 1 gave a monochloromethyl derivative of trichlorodibenzanthrone analyzing 22.90% chlorine. Dyeings of this compound (methyl trichlorodibenzanthrone) were bluer than that of the starting material and possessed very good fastness properties.

Example 7.—Chloromethylbromisodibenzanthrone

A solution of 28.8 g. bromoisodibenzanthrone in 200 cc. 100% sulfuric acid was treated exactly as in Example 6. A monochloromethyl bromisodibenzanthrone was isolated having similar properties to that of the starting material.

The chloromethyl products of these examples may be reacted with primary and secondary amines as well as tertiary amines and thiourea derivatives to produce soluble dyes.

I claim:

1. The vat dye intermediates selected from the halomethyl derivatives of a dibenzanthronyl, the latter which is selected from the group consisting of:

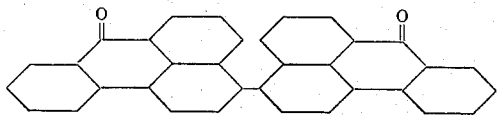

and

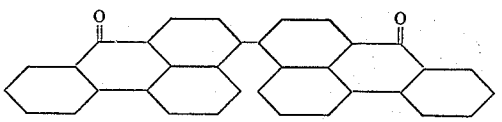

2. The vat dye intermediate having the formula:

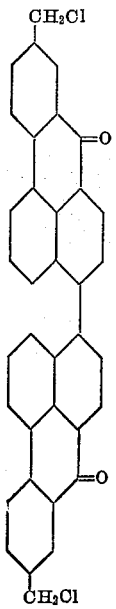

3. The vat dye intermediate having the formula:

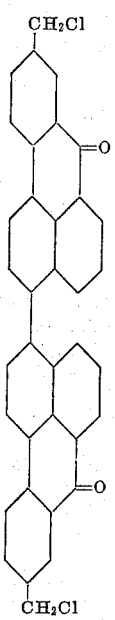

DAVID I. RANDALL.

References Cited in the file of this patent

UNITED STATES PATENTS

| Number | Name | Date |
|---|---|---|
| 1,704,983 | Luttringhaus et al. | Mar. 12, 1929 |
| 1,899,579 | Luttringhaus et al. | Feb. 28, 1933 |
| 2,058,606 | Lycan | Oct. 27, 1936 |

FOREIGN PATENTS

| Number | Country | Date |
|---|---|---|
| 562,915 | Germany | Oct. 29, 1932 |
| 613,980 | Great Britain | Dec. 7, 1948 |
| 623,998 | Great Britain | May 26, 1949 |

OTHER REFERENCES

Isler Jour. Prakt. Chem. (2) vol. 80 1909 p. 287 and 288 Fieser et al.—"Organic Chemistry" (1944) p. 656 to 660.